(12) United States Patent
Cammarata

(10) Patent No.: US 8,316,820 B1
(45) Date of Patent: Nov. 27, 2012

(54) THROTTLE PROVIDING UNOBSTRUCTED AIR FLOW PATH WHEN FULLY OPEN AND VORTEX GENERATING CONFIGURATION WHEN PARTLY OPEN

(76) Inventor: Edward Cammarata, Fort Lauderdale, FL (US)

( * ) Notice: Subject to any disclaimer, the term of this patent is extended or adjusted under 35 U.S.C. 154(b) by 0 days.

(21) Appl. No.: 13/369,890

(22) Filed: Feb. 9, 2012

Related U.S. Application Data

(63) Continuation-in-part of application No. 12/927,087, filed on Nov. 5, 2010.

(51) Int. Cl.
*F02D 9/08* (2006.01)
*F16K 5/08* (2006.01)
(52) U.S. Cl. .................... 123/336; 123/337; 251/304
(58) Field of Classification Search .................. 123/336, 123/337, 402, 403; 251/180, 304, 305; 137/616.7, 137/625.31; 261/65
See application file for complete search history.

(56) References Cited

U.S. PATENT DOCUMENTS

| | | | | |
|---|---|---|---|---|
| 4,554,948 A * | 11/1985 | Bergmann | ..................... | 251/304 |
| 4,633,833 A * | 1/1987 | Morris | .......................... | 123/336 |
| 4,892,071 A * | 1/1990 | Asayama | ...................... | 123/336 |
| 7,021,264 B2 * | 4/2006 | Giffin | ............................. | 123/336 |
| 7,219,651 B2 * | 5/2007 | Yamamoto et al. | ........... | 123/336 |

* cited by examiner

*Primary Examiner* — Willis R Wolfe, Jr.
(74) *Attorney, Agent, or Firm* — Oltman, Flynn & Kubler

(57) ABSTRACT

A throttle includes a throttle body having a generally tubular throttle body side wall with a throttle body side wall interior surface defining a throttle body interior for containing an air flow path for delivering air into at least one cylinder of an engine; and a flow regulating mechanism including an diaphragm valve secured to the throttle body and extending diametrically across the throttle body interior for progressively reducing and progressively increasing the diameter of an air flow passing valve opening defined within the diaphragm valve, and thereby regulating air flow through the throttle body.

16 Claims, 9 Drawing Sheets

THROTTLE PROVIDING UNOBSTRUCTED AIR FLOW PATH WHEN FULLY OPEN AND VORTEX GENERATING CONFIGURATION WHEN PARTLY OPEN

FILING HISTORY

This application is a continuation-in-part of application Ser. No. 12/927,087, filed on Nov. 5, 2010.

BACKGROUND OF THE INVENTION

1. Field of the Invention

The present invention relates generally to the field of internal combustion engines and engine parts. More specifically the present invention relates to a throttle having a throttle body with a tubular throttle body side wall defining a throttle body air passageway for containing an air flow path delivering air into at least one internal combustion engine cylinder, and a flow regulating mechanism comprising an annular diaphragm valve similar in configuration to an iris diaphragm camera shutter and including thick valve blades or plates fitted into a circumferential mounting recess in the throttle body side wall interior surface to be co-planar and providing a valve opening of selectively increasing or decreasing cross-sectional area, the opening being concentric with the throttle body air passageway and substantially symmetrical, thereby regulating air flow while minimizing turbulence.

The blades are configured and mounted so that as they converge to close the throttle, throughout their intermediate positions between fully open and fully closed, the define a substantially star-shaped opening. The arms of the star shape are uniformly arched along their lengths either all clockwise or all counter-clockwise, and as a result are believed to cause air passing through the partially open valve to swirl and define a vortex for enhanced engine performance. The mounting recess preferably is sufficiently deep radially that the valve blades are entirely retracted out of the air flow passageway when the valve is fully open. The mounting recess preferably is a stepped jog in the throttle body side wall interior surface.

The valve includes a stationary bottom plate, having a bottom plate upper face and preferably having a plate retaining flange protruding upwardly from the periphery of the bottom plate upper face, the stationary bottom plate preferably being fixedly attached to an engine intake manifold over and in fluid communication with the manifold intake opening. An annular rotatable actuator plate having an actuator plate central opening is rotatably retained on the bottom plate upper face and within the plate retaining flange. The annular actuator plate includes a circumferential series of arched pin travel slots.

A circumferential series of the valve blades rest flat on top of the actuator plate upper face, each blade having a downwardly protruding travel pin extending into a corresponding one of the travel slots, and each blade having an upwardly protruding fixed pivot pin. The curvature of each pin travel slot necessarily substantially follows an arc defined by the movement of the travel pin when the blade is pivoted about the fixed pivot pin. The preferred number of blades and pin travel slots is five. Each blade has an elongate and generally triangular and curved blade free, end for pivotally extending into the throttle body air passageway and a blade mounted end from which the fixed pivot pin extends.

An annular fixed top plate structure includes top plate having a central top plate opening of the same diameter and shape as, and registering with, the actuator plate opening, the bottom plate opening and includes a breather tube surrounding the top plate opening and extending upwardly from the top plate along the perimeter of the opening. The circumferential series of pin receiving holes are provided in the top plate structure lower face and the fixed pivot pin of each blade fits into a corresponding one of the pin receiving holes such that the blade is pivotable about its fixed pivot pin. The top plate structure abuts and is fixedly fastened to the bottom plate retaining flange, so that the top and bottom plates are rotationally fixed relative to each other and relative to an intake manifold to which the throttle may be attached. The actuator plate is rotatably contained between the stationary bottom plate and the fixed top plate structure.

As a result of this construction, rotation of the actuator plate relative to the top and bottom plates causes each travel pin to bear against a side of the corresponding travel slot and pivot the blades simultaneously around their respective fixed pivot pins so that the blades either pivot toward the common center of the blades to progressively close the valve, or away from the common center of the blades to a position over and along the actuator plate first face to progressively open the valve.

A metered fuel delivery assembly opening into the air passageway is optionally provided, so that the throttle becomes a carburetor.

2. Description of the Prior Art

There have long been throttles with throttle bodies for regulating air flow into the cylinders of internal combustion engines. For many decades such throttle bodies have been provided on automobile engines, in most instances being incorporated into carburetors. Within the generally tubular throttle bodies a butterfly valve plate with a diametrically protruding stem has almost invariably been pivotally mounted to the throttle body side wall and pivoted such as by linkages moved by accelerator depression and by electronic throttle control. See definition of Throttle Body in the WIKIPEDIA.COM™ on-line dictionary. A problem with these prior throttle bodies has been that the butterfly valve extends through the middle of the flow path and significantly obstructs air flow even when the valve is fully open, causing substantial drag and turbulence. What is needed is a throttle body valve which closes uniformly radially inward from the throttle body side wall at once to form a central and substantially circular variable diameter orifice with no central obstruction. To this end, applicant proposes re-structuring an iris diaphragm camera shutter into a throttle body valve, replacing the butterfly valve.

An example of an iris shutter is that disclosed in U.S. Patent Publication Number 2004/0239797 filed by Masuda on May 19, 2004 for a shutter-driving device combined with a diaphragm.

Applicant also has indirect information suggesting that a throttle having a sliding gate valve may have been provided in Great Britain, but has no actual reference to verify or to illustrate this. Should such a valve have been provided, it could not provide an opening which is in all positions generally circular or symmetrical, or one which is continually centered within the air flow path. As a result, air flow with minimized turbulence and drag is not provided.

It is thus an object of the present invention to provide a throttle having a throttle valve which creates minimal drag and turbulence in the air flow stream through a throttle body so that air is delivered into engine cylinders with maximum efficiency.

It is another object of the present invention to provide such a throttle valve which creates such improved flow efficiency by providing and maintaining an unobstructed valve opening.

It is still another object of the present invention to provide such a throttle valve which creates a valve opening which is substantially circular or polygon opening at all degrees of valve opening so that air passes uniformly and evenly through a symmetrical valve opening and air flow is smooth and laminar to the fullest extent possible.

It is yet another object of the present invention to provide such a throttle valve which gives enhanced efficiency at full throttle, as well as at partial throttle.

It is a still further object of the present invention to provide such a throttle valve which can have a smaller diameter inlet hole than a prior butterfly valve of equivalent capacity.

It is a yet further object of the present invention to provide center-feed air flow, and where desired, center-feed air flow, that is air flow from the center outward, with a twist to create a vortex in the air flow.

It is finally an object of the present invention to provide such a throttle which is sturdy, durable, reliable, compact, and cost effective to manufacture.

SUMMARY OF THE INVENTION

The present invention accomplishes the above-stated objectives, as well as others, as may be determined by a fair reading and interpretation of the entire specification.

A throttle is provided including a throttle body having a generally tubular throttle body side wall with a throttle body side wall interior surface defining a throttle body interior for containing an air flow path for delivering air into at least one cylinder of an engine; and a flow regulating mechanism including a diaphragm valve secured to the throttle body and extending diametrically across the throttle body interior for progressively reducing and progressively increasing the diameter of an air flow passing valve opening defined within the diaphragm valve, and thereby regulating air flow through the throttle body.

The throttle preferably additionally includes a circumferential mounting channel along and extending around and into the throttle body side wall interior surface and having a channel radial bottom surface, where the diaphragm valve is mounted within the mounting channel. The mounting channel preferably is the interior portion of a recess in the throttle body side wall. The mounting channel preferably is sufficiently deep relative to the diaphragm valve that the diaphragm valve is entirely contained within the mounting channel when the diaphragm valve is fully open.

A throttle is further provided including a throttle body with a tubular throttle body side wall defining a throttle body air passageway having an air passageway center for containing an air flow path for delivering air into an internal combustion engine;
and an air flow regulating annular diaphragm valve including a number of valve blades mounted to converge radially toward and retract from the center of the air passageway to provide a valve opening of selectively increasing or decreasing cross-sectional area, the opening being concentric with the throttle body air passageway and substantially symmetrical, thereby regulating air flow while minimizing turbulence.

The blades preferably are configured and mounted so that as they converge to close the air passageway, throughout their intermediate positions between fully open and fully closed, they define a substantially star-shaped opening, wherein the arms of the star shape are uniformly arched along their lengths in one of a clockwise direction and a counter-clockwise direction; so that the blades are believed to cause air passing through the partially open valve to swirl and define a vortex for enhanced engine performance. The valve blades preferably retract radially entirely out of the air flow passageway when the valve is fully open. The mounting recess preferably is a stepped jog in the throttle body side wall interior surface.

The valve preferably includes a stationary bottom plate for fixed attachment to an engine intake manifold over and in fluid communication with the manifold intake opening and having a bottom plate upper face and having a plate retaining flange protruding upwardly from the periphery of the bottom plate upper face; a rotatable annular actuator plate having an actuator plate central opening rotatably retained on the bottom plate upper face and within the plate retaining flange, the annular actuator plate including a circumferential series of arched pin travel slots, a circumferential series of the valve blades rest flat on top of the actuator plate upper face, each blade having a downwardly protruding travel pin extending into a corresponding one of the travel slots, and each blade having an upwardly protruding fixed pivot pin, the curvature of each pin travel slot substantially follows an arc defined by the movement of the travel pin when the blade is pivoted about the fixed pivot pin, and an annular fixed top plate structure including top plate having a central top plate opening of the same diameter and shape as, and registering with, the actuator plate opening, the bottom plate opening and a breather tube surrounding the top plate opening and extending upwardly from the plate along the perimeter of the opening, a circumferential series of pin receiving holes in the top plate structure lower face, where the fixed pivot pin of each blade fits into a corresponding one of the pin receiving holes so that the blade is pivotable about its fixed pivot pin; the top plate structure abutting and being fixedly fastened to the bottom plate retaining flange, so that the top and bottom plates are rotationally fixed relative to each other and the actuator plate is rotatably contained between the stationary bottom plate and the fixed the top plate structure; so that rotation of the actuator plate relative to the top and bottom plates causes each travel pin to bear against a side of the corresponding the travel slot and pivot the blades simultaneously around their respective fixed pivot pins so that the blades one of pivot toward the collective common center of the blades to progressively close the valve, and away from the common center of the number of blades to a position over and along the actuator plate first face to progressively open the valve.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
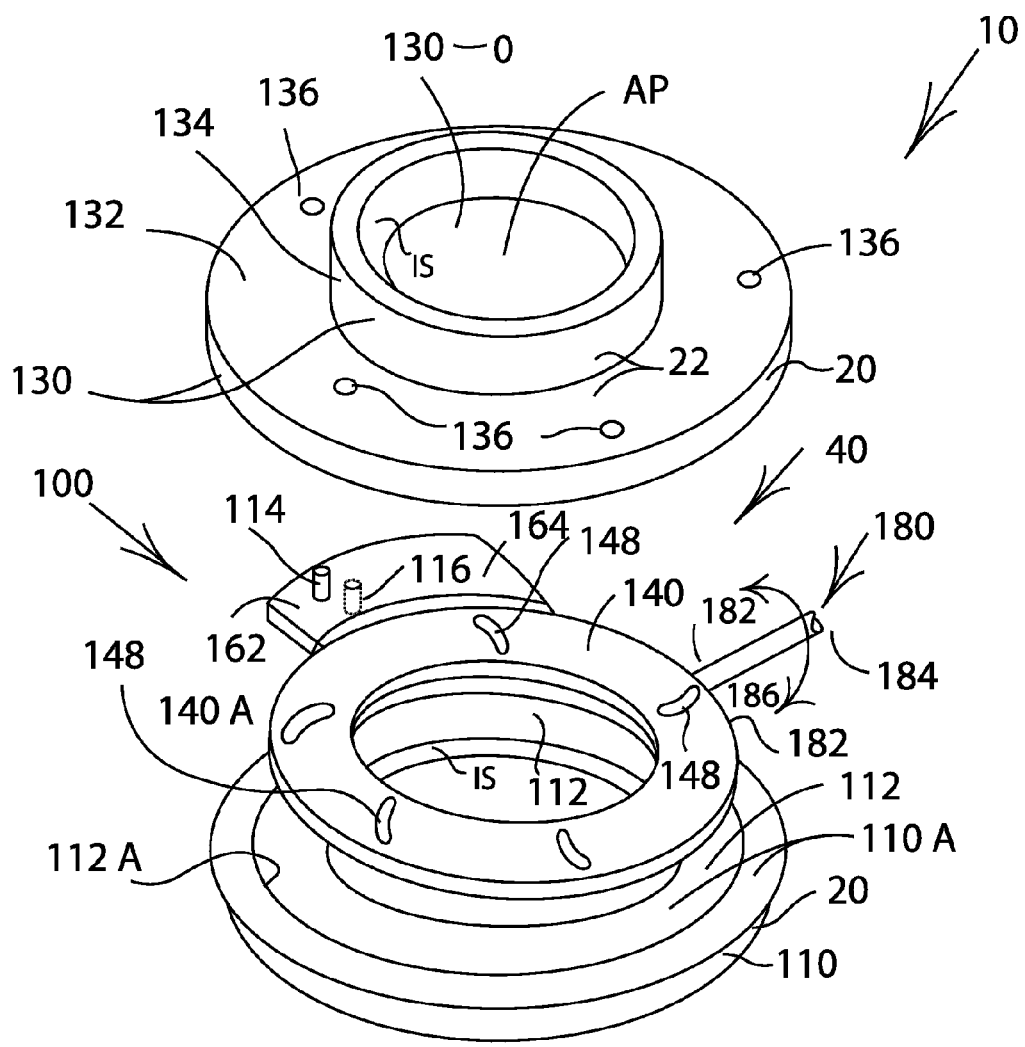
FIG. 1 is an exploded perspective view of the preferred embodiment of the throttle, revealing the various parts of the valve.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
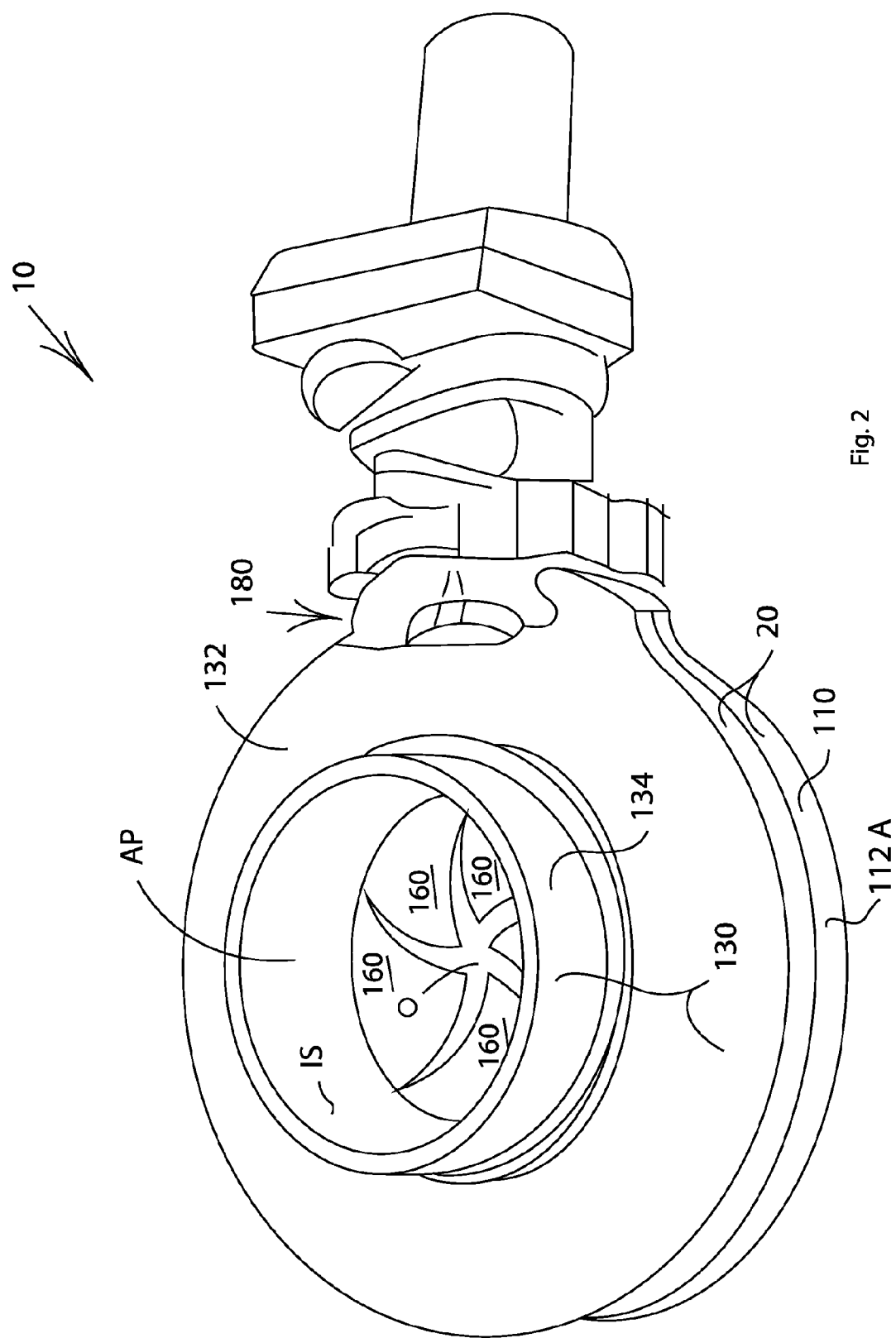
FIG. 2 is an assembled perspective view Of the throttle of FIG. 1, with the remainder of the throttle added.
Figure 3:
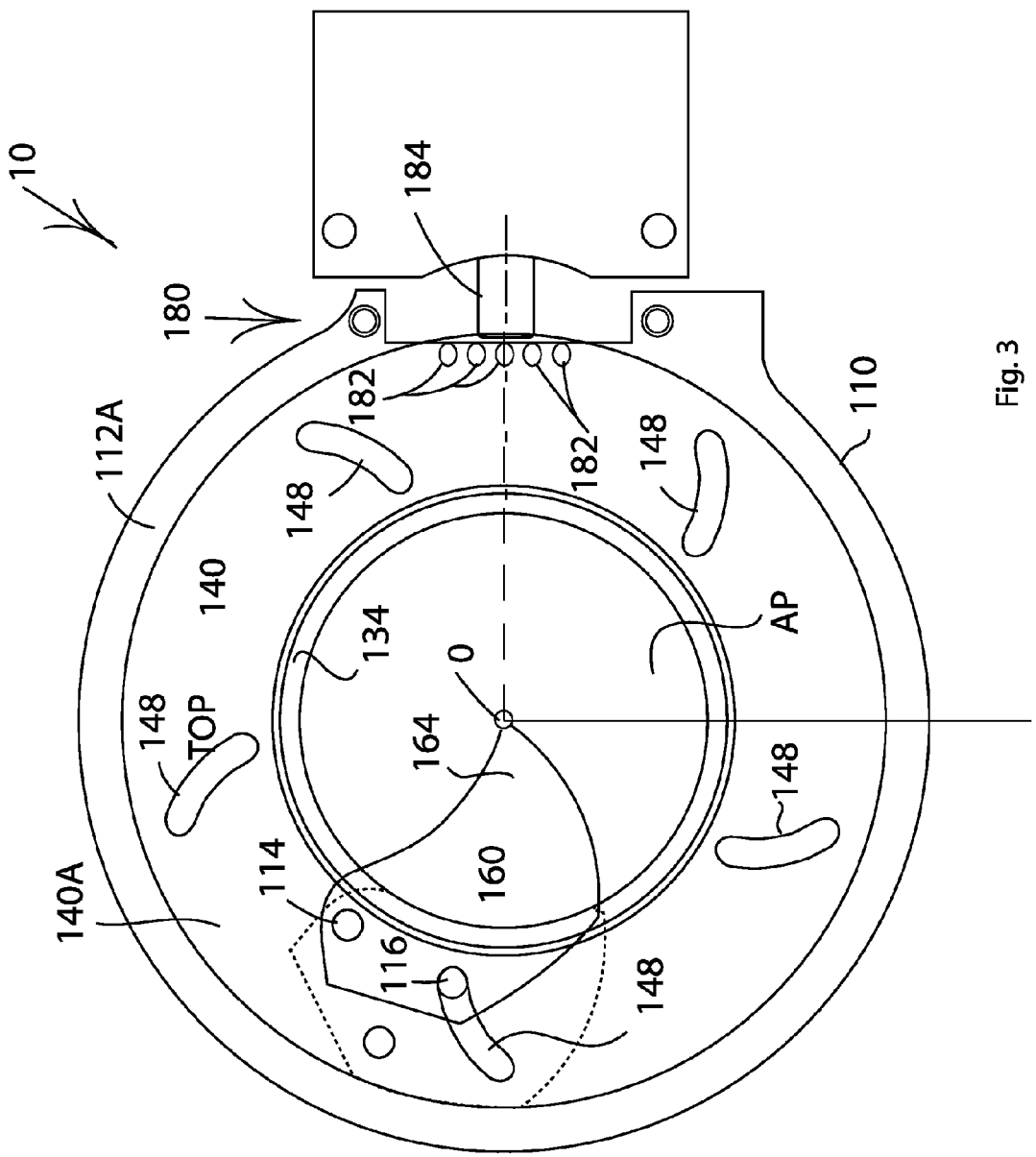
FIG. 3 is a top view of the throttle of FIG. 2, with the top plate assembly removed to reveal the actuator plate and one of the blades.
Figure 4:
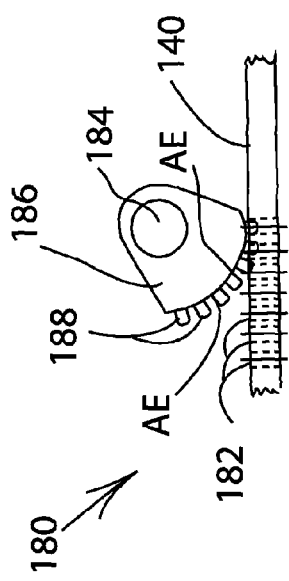
FIG. 4 is a side view of the actuator plate showing the circumferential series of drive ports in the actuator plate and drive cogs on the pivoting drive plate of the valve operating assembly.
Figure 5:
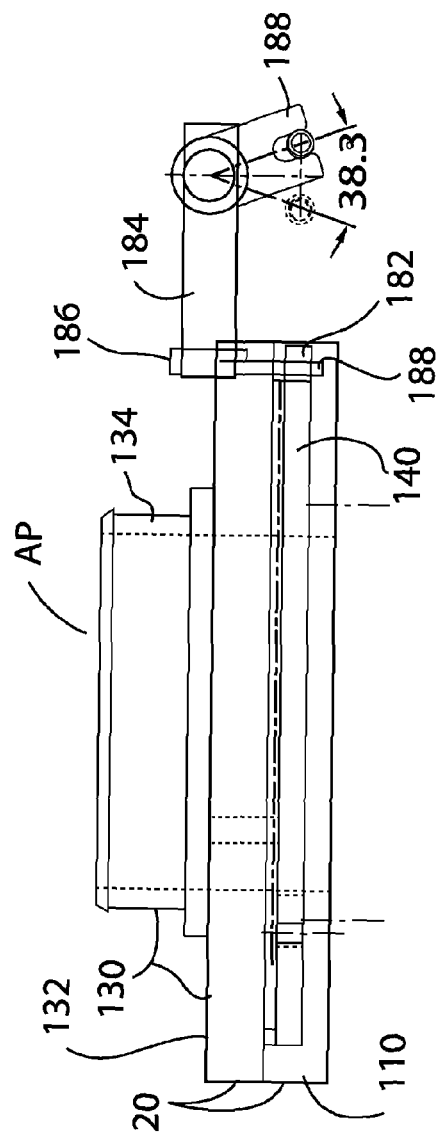
FIG. 5 is a cross-sectional side view of the throttle of FIG. 4.
Figure 6:
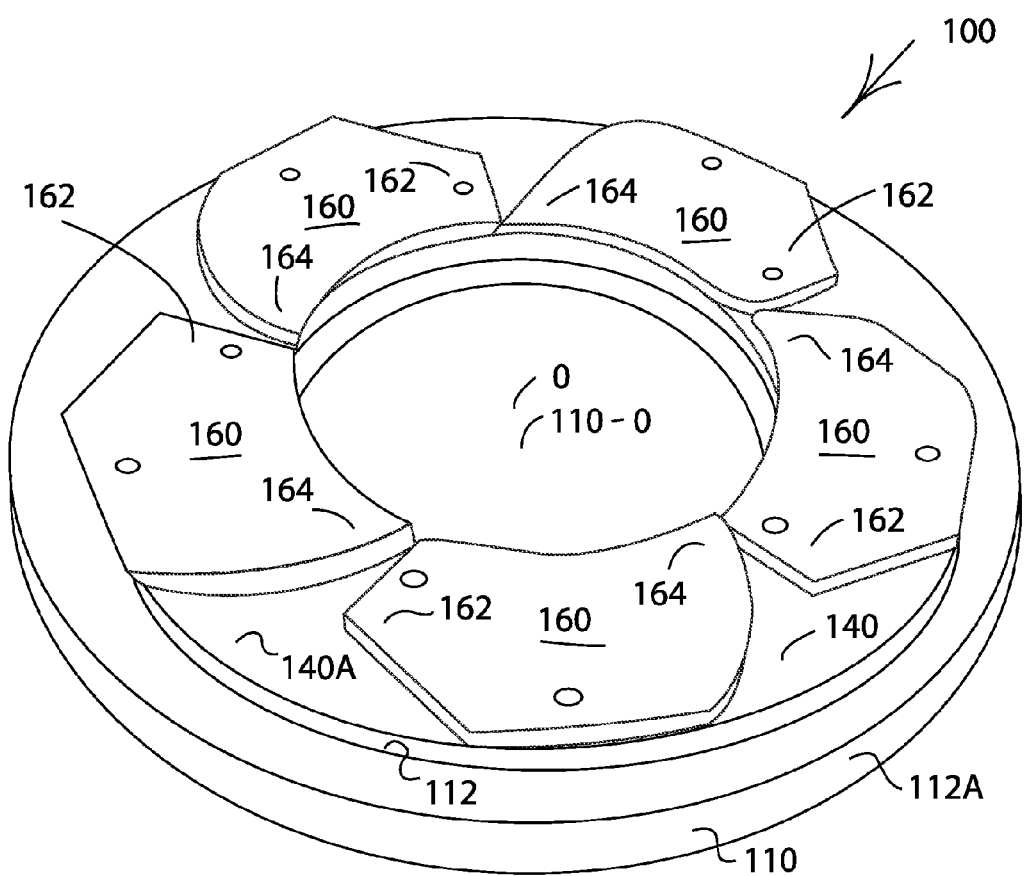
FIG. 6 is a perspective view of the assembled bottom plate, actuator plate rotatably resting within the recess, and the preferred valve blades resting on top of the actuator plate in the fully open valve position.
Figure 7:
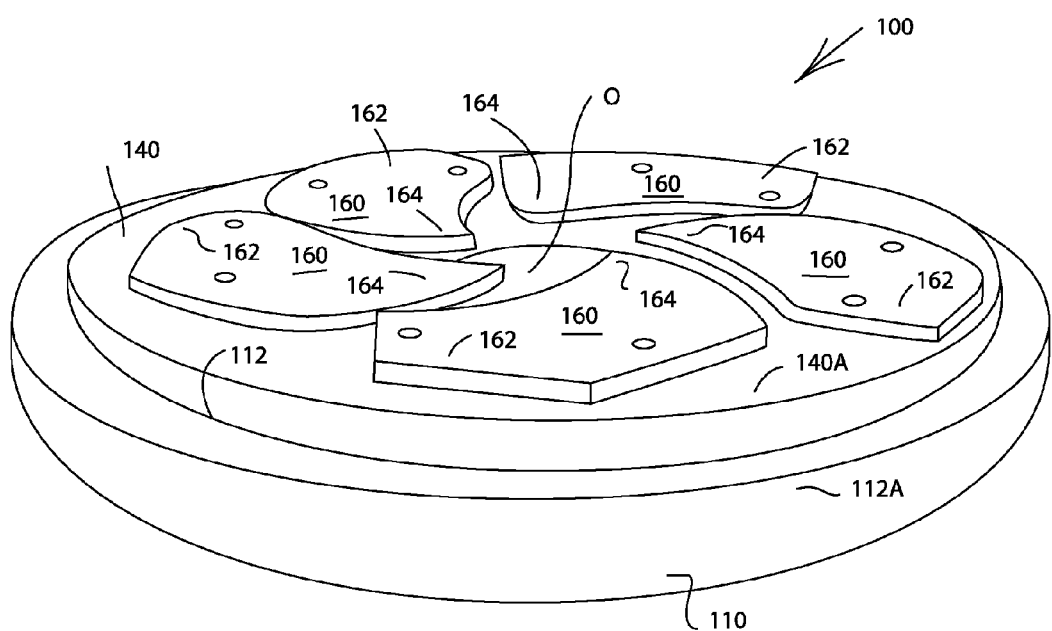
FIG. 7 is a perspective view as in FIG. 6, except that it is more of a side view and the valve blades are shown in the partially closed position to define a star-shaped opening for producing a vortex.
Figure 8:
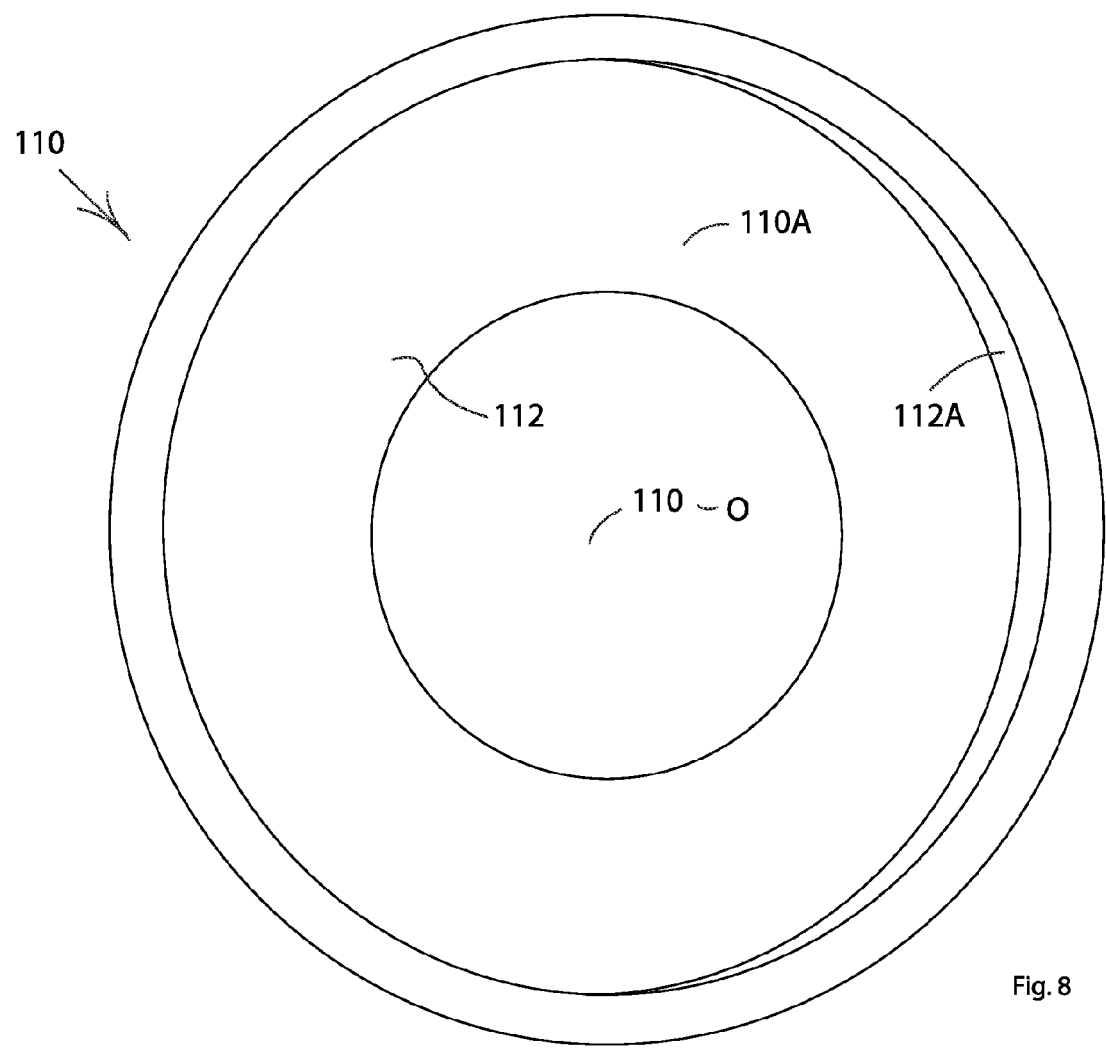
FIG. 8 is a top perspective view of the bottom plate.
Figure 9:
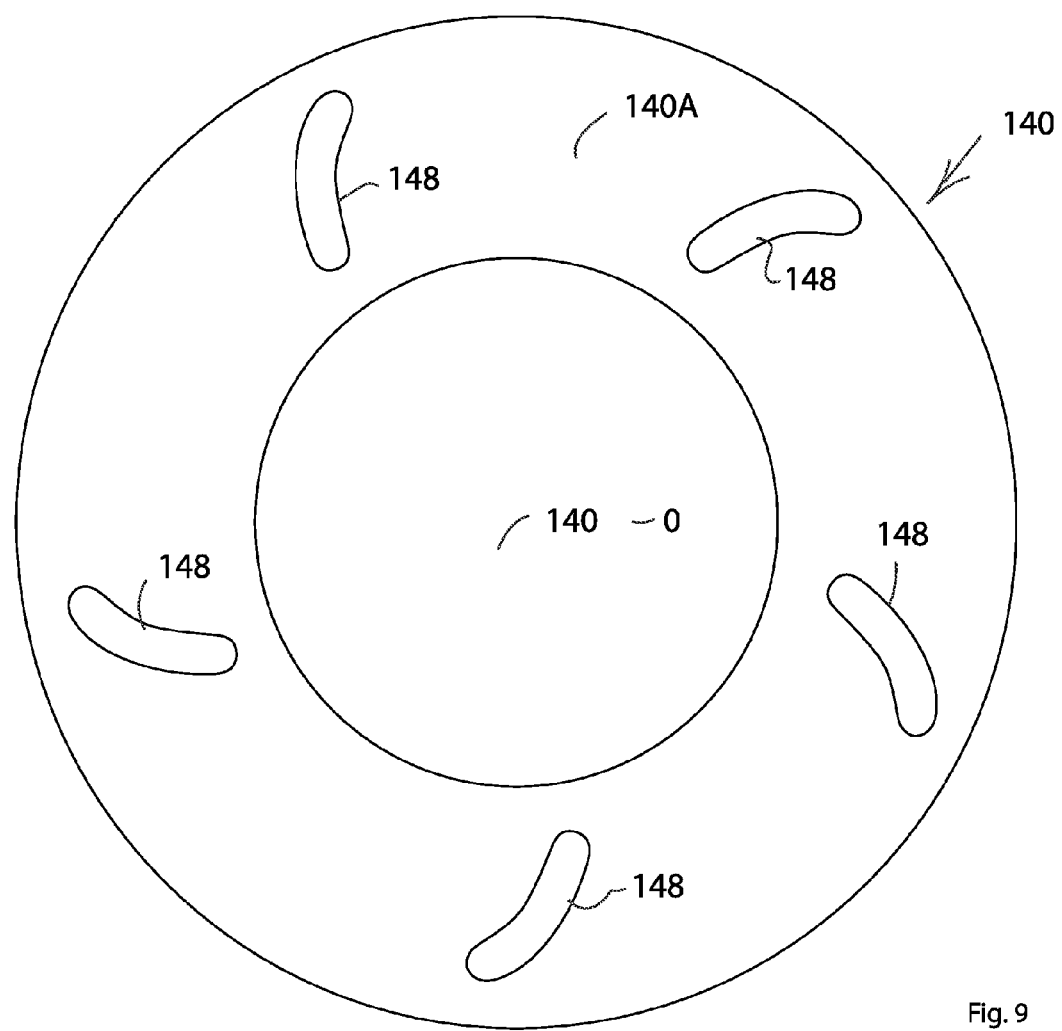
FIG. 9 is a top view of the actuator plate.
Figure 10:
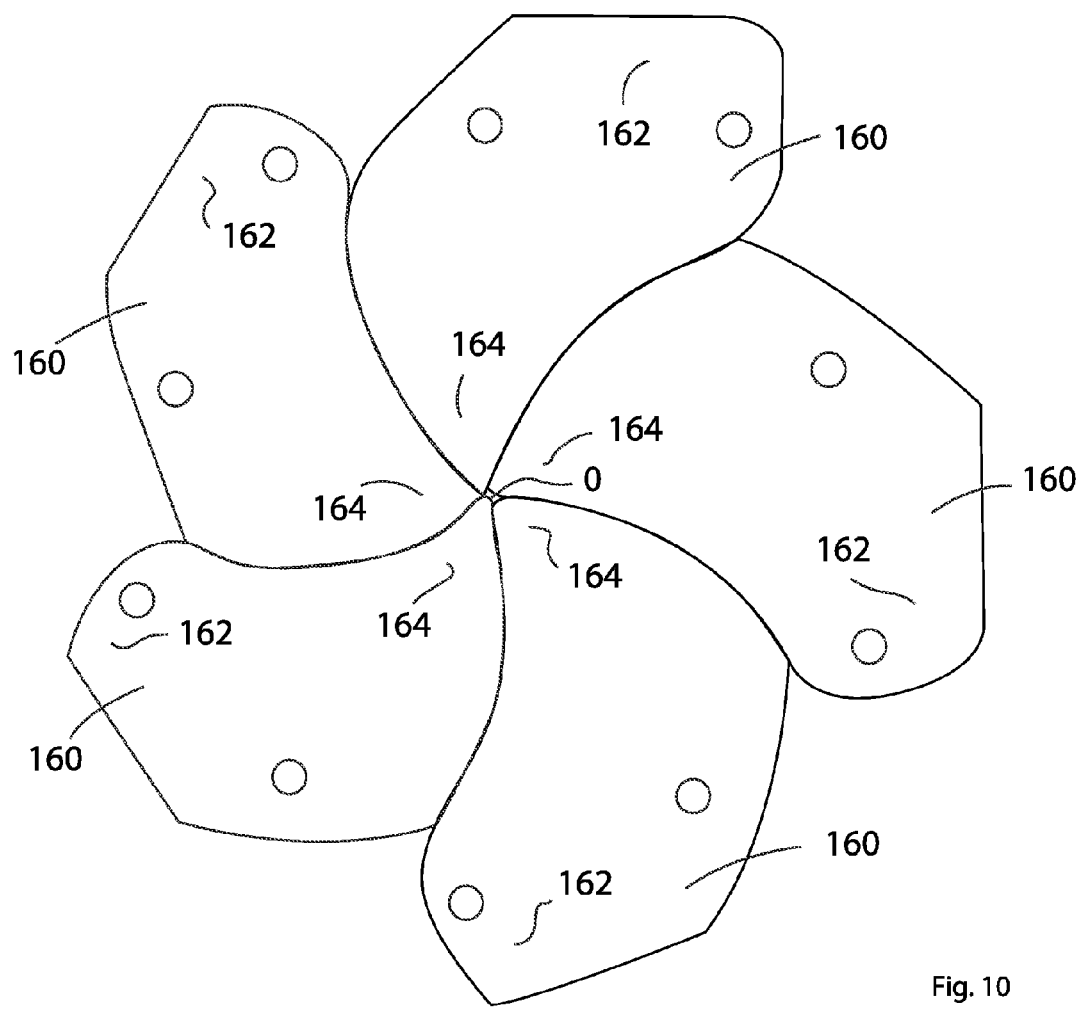
FIG. 10 is a top view of the valve blades alone, in a fully closed valve position.

Referring to FIGS. 1-10, a throttle 10 having a throttle body 20 with a tubular throttle body side wall 22 defining a throttle body air passageway AP for containing an air flow path delivering air into at least one internal combustion engine cylinder (not shown), and a flow regulating mechanism 40 comprising an annular diaphragm valve 100 including thick valve blades 160 or plates which retract fully out of the air passageway AP and are co-planar, and which provide a valve opening O of selectively increasing or decreasing cross-sectional area, the opening being concentric with the throttle body air passageway AP and substantially symmetrical, thereby regulating air flow while minimizing turbulence.

The blades 160 are configured and mounted so that as they converge to close the throttle 10, throughout their intermediate positions between fully open and fully closed, they define a substantially star-shaped opening. The arms of the star shape are uniformly arched along their lengths either all clockwise or all counter-clockwise, and as a result are believed to cause air 160 is entirely contained within the mounting recess 112 when the valve 100 is fully open. The mounting recess 112 preferably is a stepped jog in the throttle body side wall 22 interior surface IS.

The valve 100 includes a stationary bottom plate 110 having a bottom plate upper face 110A and preferably having a plate retaining flange 112A upwardly from the periphery of the bottom plate upper face 110A to define a circumferential mounting recess 112 in the throttle body side wall 22 interior surface, the stationary bottom plate 110 preferably being fixedly attached to an engine intake manifold (not shown) over and in fluid communication with the manifold intake opening. An annular rotatable actuator plate 140 having an actuator plate opening 140-O is rotatably retained on the bottom plate upper face 110A and within the plate retaining flange 112A and thus within mounting recess 112. The annular actuator plate 140 includes a circumferential series of arched pin travel slots 148.

A circumferential series of the valve blades 160 rest flat on top of the actuator plate upper face 140A, each blade 160 having a downwardly protruding travel pin 116 extending into a corresponding one of the travel slots 148, and each blade 160 having an upwardly protruding fixed pivot pin 114. The curvature of each pin travel slot 148 necessarily substantially follows an arc defined by the movement of the travel pin 116 when the blade 160 is pivoted about the fixed pivot pin 114. The preferred number of blades 160 and pin travel slots 148 is five, but this should not be viewed as limiting and the provision of other numbers of blades 160 is contemplated. Each blade 160 has an elongate and generally triangular and curved blade free end 164 for pivotally extending into the throttle body air passageway AP and a blade mounted end 162 from which the fixed pivot pin 114 extends.

An annular fixed top plate structure 130 includes top plate 132 having a central top plate opening 130-O if the same diameter and shape as, and registering with, the actuator plate opening 140-O, and the bottom plate opening 110-O and includes a breather tube 134 surrounding the top plate opening 130-O and extending upwardly from the top plate 132 along the perimeter of the opening 130-O. The circumferential series of fixed pin receiving holes 136 are provided in the top plate 132 lower face and the fixed pivot pin 114 of each blade 160 fits into a corresponding one of the pin receiving holes 136 such that the blade 160 is pivotable about its fixed pivot pin 114. The top plate structure 130 abuts and is fixedly fastened to the bottom plate retaining flange 112A, so that the top and bottom plates 130 and 110, respectively, are rotationally fixed relative to each other and relative to an intake manifold (not shown) to which the throttle 10 may be attached. The actuator plate 140 is rotatably contained between the stationary bottom plate 110 and the fixed top plate 132.

The fixed pins 114 optionally each are fixedly secured within either, though not both, of their blade fixed pin blade ports 114A and their top plate fixed pin holes 136, such as by press-fitting, while being rotatable within their opposing port or hole, but alternatively may be rotatable within at both pin 114 ends within both the given blade fixed pin blade port 114A and the given top plate fixed pin receiving hole 136. The travel pins 116 optionally are each fixedly secured within their travel pin blade ports 114A, but alternatively are each rotatably fitted within their blade ports 114A. An advantage to fixedly securing one end of the fixed pins 114 into one of their blade port 114A and top plate hole 136 and of securing the travel pins 116 into their blade ports 116A is that pins 114 and 116 remain secure against being dropped or lost during manufacture.

Although the converging blade diaphragm valve 100 itself preferably is essentially a variation of the conventional iris diaphragm camera shutter, the present blades 160 are entirely co-planar and abut each other at their edges, rather than overlap each other when the valve 100 is closed. Other converging blade valve 100 configurations are contemplated.

As a result of this construction, rotation of the actuator plate 140 relative to the top and bottom plates 132 and 110, respectively, causes each travel pin 116 to bear against a side of the corresponding travel slot 148 and pivot the blades 160 simultaneously around their respective fixed pivot pins 114 so that the blades 160 either pivot toward the common center of the blades 160 to progressively close the valve 100, or away from the common center of the blades 160 to a position over and along the actuator plate upper face 140A to progressively open the valve 100.

A valve operating assembly 180 is provided, which preferably includes a pair of spaced apart series of drive ports 182 near a segment of the perimeter of the actuator plate 140. See FIGS. 1, 4 and 5. A valve control shaft 184 is rotatably mounted to extend substantially radially from the actuator plate 140, above the actuator plate 140. The control shaft 184 has a drive plate 186 secured to and protruding perpendicularly therefrom over the drive depressions 182, the drive plate 186 having an arched edge AE from which a spaced series of drive cogs 188 radially protrude so that the drive cog 188 in the most downward orientation extends into one of the drive depressions 182 so that rotation of the control shaft 184 causes the drive cog 188 to bear against a side of the given drive depression 182 and rotate the actuator plate 140 within the mounting recess 112 and relative to the stationary bottom plate 110 and top plate assembly 130 to open or close the valve 100.

Alternatively, the iris diaphragm shutter disclosed in U.S. Patent Application Publication Number 2004/0239797 filed by Masuda is believed to be generally suitable to be the present iris diaphragm valve 100.

A metered fuel delivery assembly opening into the air passageway (not shown) is optionally provided, so that the throttle 10 becomes a carburetor.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A throttle comprising:
a throttle body having a generally tubular throttle body side wall with a throttle body side wall interior surface defining an air flow passing throttle body interior for containing an air flow path for delivering air into at least one cylinder of an engine;
and flow regulating a diaphragm valve comprising at least one valve blade pivotally secured to said throttle body and extending substantially diametrically to pivot across at least a portion of said air flow passing throttle body interior for selectively reducing and for selectively increasing the cross-sectional area diameter of said an air flow passing throttle body interior, and thereby regulating air flow through said throttle body.

2. A throttle comprising:
a throttle body having a generally tubular throttle body side wall with a throttle body side wall interior surface defining an air flow passing throttle body interior for containing an air flow path for delivering air into at least one cylinder of an engine;
and flow regulating diaphragm valve comprising at least one valve blade pivotally secured relative to said throttle body and extending substantially diametrically to pivot across at least a portion of said air flow passing throttle body interior for selectively reducing and for selectively increasing the cross-sectional area of said air flow passing throttle body interior, and thereby regulating air flow through said throttle body.

3. The throttle body of claim 2, comprising at least two said valve blades pivotally mounted relative to said throttle body to pivot across said throttle body interior and toward each other to progressively decrease the cross-sectional area of the air flow passing opening, and to pivot out of said throttle body interior and away from each other to progressively increase the cross-sectional area of the air flow passing valve opening.

4. The throttle of claim 2, additionally comprising a circumferential mounting channel along and extending around and into said throttle body side wall interior surface and having a channel radial bottom surface, wherein said diaphragm valve is mounted within said mounting channel.

5. The throttle of claim 4, wherein said mounting channel is the interior portion of a recess in said throttle body side wall.

6. The throttle of claim 4, wherein said mounting channel is sufficiently deep relative to said diaphragm valve that said diaphragm valve is entirely contained within said mounting channel when said diaphragm valve is fully open.

7. A throttle comprising:
a throttle body with a tubular throttle body side wall defining a throttle body air passageway having an air passageway center for containing an air flow path for delivering air into an internal combustion engine;
and an air flow regulating annular diaphragm valve comprising a plurality of valve blades mounted to converge radially toward and retract from the center of the air passageway to provide a valve opening of selectively increasing or decreasing cross-sectional area, the opening being concentric with the throttle body air passageway and substantially symmetrical, thereby regulating air flow while minimizing turbulence.

8. The throttle of claim 7, wherein said blades are configured and mounted such that as they converge to close the air passageway, throughout their intermediate positions between fully open and fully closed, they define a substantially star-shaped opening, wherein the arms of the star shape are uniformly arched along their lengths in one of a clockwise direction and a counter-clockwise direction;
such that said blades are believed to cause air passing through the partially open valve to swirl and define a vortex for enhanced engine performance.

9. The throttle of claim 7, wherein said mounting recess is a stepped jog in said throttle body side wall interior surface.

10. The throttle of claim 7, wherein each said blade has an elongate and generally triangular and curved blade free end for pivotally extending into the throttle body air passageway and a blade mounted end from which said fixed pivot pin extends.

11. The throttle of claim 7, wherein each said valve blade has an elongate and generally triangular shape.

12. The throttle of claim 7, wherein a valve opening between the blades remains when said blades are pivoted to maximum closure to permit air flow suitable for engine idle.

13. The throttle of claim 7, wherein said valve blades retract radially entirely out of the air flow passageway when said valve is fully open.

14. The throttle of claim 13, wherein each said valve blade has a longitudinal curve.

15. The throttle of claim 7, wherein said valve comprises a stationary bottom plate for fixed attachment to an engine intake manifold over and in fluid communication with the manifold intake opening and having a bottom plate upper face and having a plate retaining flange protruding upwardly from the periphery of said bottom plate upper face;
a rotatable annular actuator plate having an actuator plate central opening rotatably retained on said bottom plate upper face and within said plate retaining flange, said annular actuator plate comprising a circumferential series of arched pin travel slots;

a circumferential series of the valve blades rest flat on top of said actuator plate upper face, each said blade having a downwardly protruding travel pin extending into a corresponding one of said travel slots, and each said blade having an upwardly protruding fixed pivot pin, the curvature of each said pin travel slot substantially follows an arc defined by the movement of said travel pin when said blade is pivoted about said fixed pivot pin;

and an annular fixed top plate structure comprising top plate having a central top plate opening of the same diameter and shape as, and registering with, the actuator plate opening, the bottom plate opening and a breather tube surrounding the top plate opening and extending upwardly from said plate along the perimeter of the opening, a circumferential series of pin receiving holes in the top plate structure lower face, wherein said fixed pivot pin of each said blade fits into a corresponding one of said pin receiving holes such that the blade is pivotable about its fixed pivot pin;

said top plate structure abutting and being fixedly fastened to the bottom plate retaining flange, such that said top and bottom plates are rotationally fixed relative to each other and said actuator plate is rotatably contained between the stationary bottom plate and the fixed said top plate structure;

such that rotation of said actuator plate relative to said top and bottom plates causes each said travel pin to bear against a side of the corresponding said travel slot and pivot said blades simultaneously around their respective fixed pivot pins such that said blades one of pivot toward the collective common center of said blades to progressively close said valve, and away from the common center of said plurality of blades to a position over and along said actuator plate first face to progressively open said valve.

16. The throttle of claim 15, wherein the number of said blades and pin travel slots is five.

* * * * *